Dec. 25, 1928.  E. C. HASSLER  1,696,882
BLOWER
Filed Dec. 16, 1925
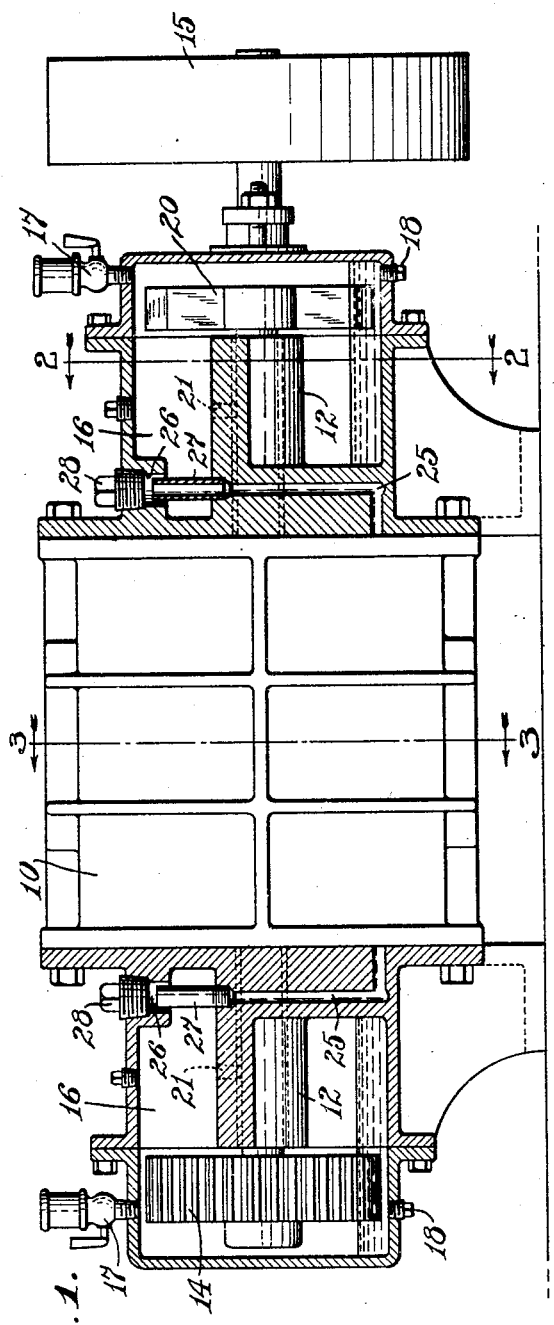
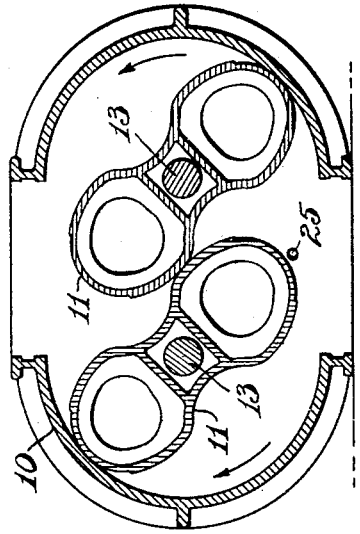
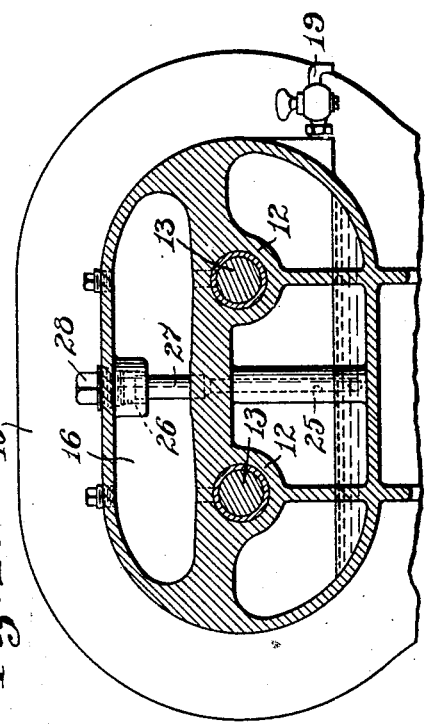
INVENTOR.
Ernest C. Hassler,
BY
Hood + Hahn
ATTORNEYS Patented Dec. 25, 1928.

1,696,882

UNITED STATES PATENT OFFICE.

ERNEST C. HASSLER, OF CONNERSVILLE, INDIANA, ASSIGNOR TO THE CONNERSVILLE BLOWER CO., OF CONNERSVILLE, INDIANA, A CORPORATION OF INDIANA.

BLOWER.

Application filed December 16, 1925. Serial No. 75,698.

In the operation of blower and gas exhausters of the lobed impeller type, where there are two lobed impellers within and contacting with an enclosing casing and contacting with each other, considerable difficulty is experienced, in connection with the proper lubrication of the impeller shafts, shaft bearings and connecting gears because of the creeping of the oil from the bearings into the impeller casing.

The object of the present invention is to provide a simple, yet efficient structure by means of which lubricating oil may be prevented from entering the impeller chamber while at the same time the impeller shafts, bearings and connecting gears may be thoroughly lubricated.

The accompanying drawings illustrate an embodiment of my invention.

Fig. 1 is a side elevation, in partial vertical section, of a blower or exhauster embodying my invention;

Fig. 2 is a section on line 2—2 of Fig. 1, and

Fig. 3 is a section on line 3—3 of Fig. 1.

My invention is shown as embodied in a blower or exhauster of common form in which the casing 10, the lobed impellers 11, 11, the shaft bearings 12, the impeller shafts 13, connecting gears 14 and driving wheel 15 are of common form, the impellers at their tips contacting with the interior of the casing and along their lobes contacting with each other, in a common and well known manner.

For the purposes of my invention I form around the shaft bearings, and the shaft connecting gears, a gas-tight chamber 16 which, for convenience, may be provided with filling cocks 17, through which lubricating oil may be inserted, and drainage plugs 18 to permit drainage of lubricant, the chamber 16 being so formed as to retain a desired amount of lubricant, and overflow cocks 19 being provided for convenience in determining the desired level of lubricant so that the gears 14, or paddles 20, may serve as splashers to deliver oil to passages 21 leading through the tops of the bearing blocks to the interiors of bearings 12.

In order to insure within each chamber 16 a lower pressure than the pressure produced on the pressure side of the impellers, I provide, for each of said chambers, a passage 25 which at one end communicates with the interior of a chamber 16 and at the other end communicates with the low pressure side of the impeller casing, i. e., at a point on the low pressure side of the line of contact between the lobes of the two impellers.

In the present illustration the passage 25 enters the impeller chamber below its middle because the impellers are rotated in the directions indicated by the arrows. If the impellers were rotated in the opposite direction, passages 25 should enter the impeller chamber above the line of lobe contact.

It is important that oil be prevented from entering passages 25 from the chamber 16 and in order to accomplish this result I form an enlarged bore or passage 26 through the top wall of chamber 16, in alignment with the upper end of passage 25, and continue said passage 25, by means of a small pipe 27, up through the bore 26 so that bore 26 will form a protective bell, or hood, for the upper end of pipe 27. By this construction, any oil which may accumulate upon the under surface of the top wall of the chamber 16 will drip from the skirts of the bell and will be prevented from entering passage 25. The outer ends of the bores 26 may be conveniently closed, in an air tight manner, by plugs 28.

I claim as my invention:

1. In a pump of the co-acting lobed impeller type, an air tight oil retaining enclosure surrounding and communicating with the shaft bearings thereof, and means for maintaining in said casing a lower pressure than in the pump casing at the shaft entry point comprising a passage leading from the upper regions of said enclosure to the interior of the impeller chamber in the region of lesser pressure.

2. In a pump of the co-acting lobed impeller type, an air tight oil retaining enclosure surrounding and communicating with the shaft bearings, and a passage leading from the upper regions of said enclosure to the interior of the impeller chamber in the region of lesser pressure the closure end of said passage being shielded against entry of oil.

In witness whereof, I, ERNEST C. HASSLER, have hereunto set my hand at Connersville, Indiana, December, A. D. one thousand nine hundred and twenty five.

ERNEST C. HASSLER.